United States Patent [19]
Spahl et al.

[11] Patent Number: 6,038,306
[45] Date of Patent: Mar. 14, 2000

[54] METHOD AND APPLICATION MEANS FOR ESTABLISHING PERFORMANCE FEATURES IN PRIVATE COMMUNICATION SYSTEMS OF A PUBLIC COMMUNICATION NETWORK

[75] Inventors: Siegfried Spahl, Puchheim, Germany; Guenter Lukas, Vienna, Austria; Dietmar Ratzberger, Haidershof, Austria; Friedrich Kopitar, Etsdorf, Austria

[73] Assignee: Siemens Aktiengesellschaft, Munich, Germany

[21] Appl. No.: 08/846,326

[22] Filed: Apr. 30, 1997

[30] Foreign Application Priority Data

Apr. 30, 1996 [DE] Germany .................. 196 17 392

[51] Int. Cl.[7] .................................................. H04M 3/42
[52] U.S. Cl. .................... 379/209; 379/210; 379/211; 379/212; 379/215
[58] Field of Search ....................... 379/201, 209, 379/67, 202, 159, 650, 233, 112, 199, 196, 204, 210, 211, 205, 142, 57; 395/309; 455/89

[56] References Cited

U.S. PATENT DOCUMENTS

| | | | |
|---|---|---|---|
| 5,311,583 | 5/1994 | Friedes et al. | 379/209 |
| 5,574,870 | 11/1996 | Dziennus et al. | 395/309 |
| 5,590,183 | 12/1996 | Yoneda et al. | 379/142 |
| 5,673,299 | 9/1997 | Fuller et al. | 379/210 |
| 5,689,825 | 11/1997 | Averbuch et al. | 455/89 |

FOREIGN PATENT DOCUMENTS 0 531 048 A2  10/1993  European Pat. Off. .

*Primary Examiner*—Fan S. Tsang
*Assistant Examiner*—Bing Bui
*Attorney, Agent, or Firm*—Hill & Simpson

[57] ABSTRACT

The method and application apparatus establish performance features in a private communication system of a public communication network. Unsuccessful calls coming in from a public communication system to communication terminal apparatuses (KE1...n) of a private communication system (KS), as well as calls (ar', ar") directed to private performance feature communication terminal apparatuses (KE-AUL, KE-RR), are acquired in the private communication system (KS) and reported to the application apparatus (PC). Using the application apparatus (PC), a performance feature, for example call forwarding (AUL) or callback (RR), is set up or, respectively, introduced, dependent on the acquired incoming calls (ar', ar").

12 Claims, 3 Drawing Sheets

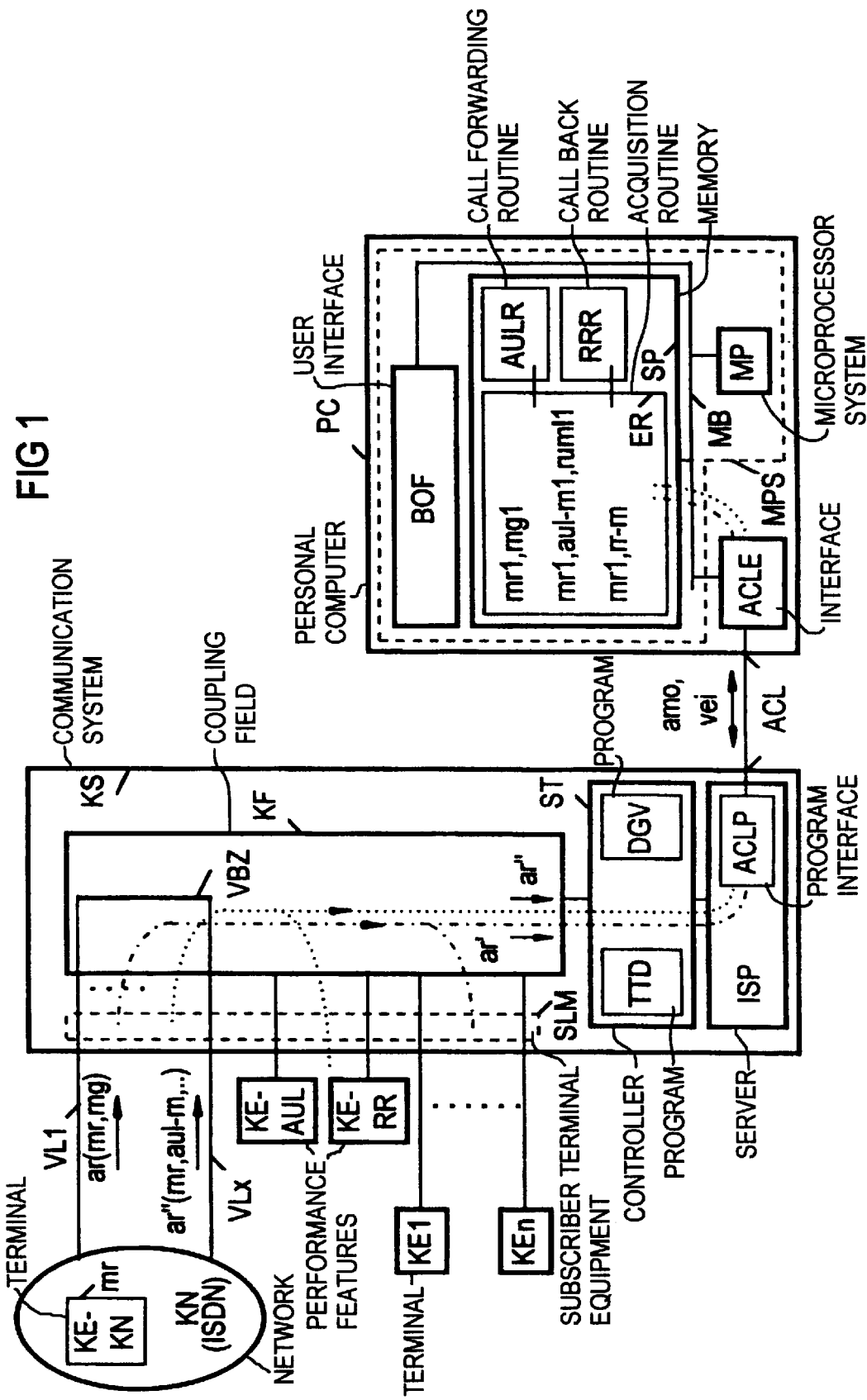

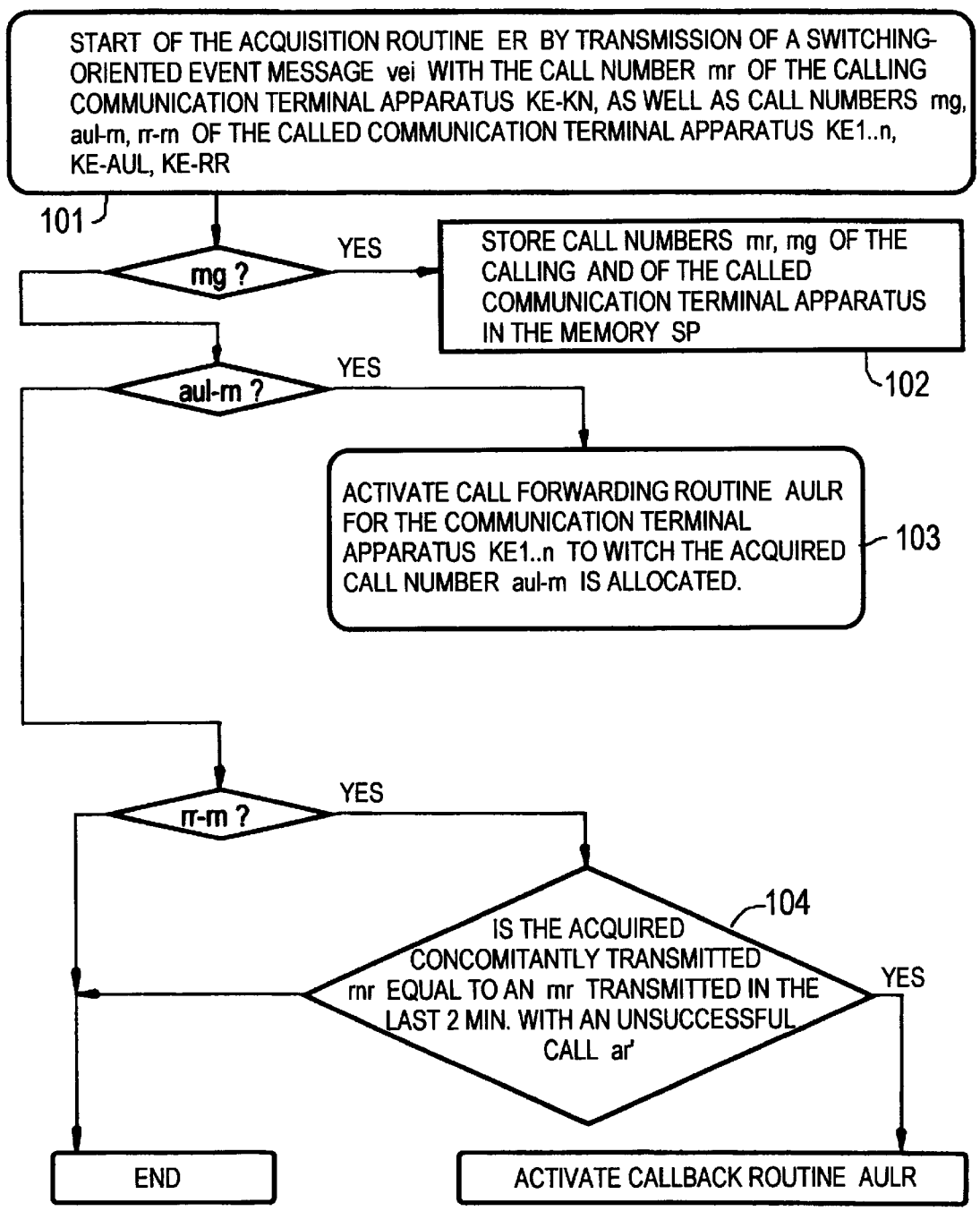

FIG 2B

201 — START OF THE CALLBACK ROUTINE RRR BY MEANS OF A SWITCHING-ORIENTED EVENT MESSAGE vei TRANSMITTED BY THE COMMUNICATION SYSTEM KS, WHICH EVENT MESSAGE INDICATES THE END OF AN ACTIVITY OF A COMMUNICATION TERMINAL APPARATUS KE1...n FOR WHICH A CALLBACK RR IS ENTERED OR, RESPECTIVILY, ACTIVATED.

202 — FORMATION AND TRANSMISSION OF AN OPERATIONS AND MAINTENANCE INSTRUCTION amo TO THE COMMUNICATION SYSTEM KS WITH THE CALL NUMBERS mr, rng, BY MEANS OF WHICH A CONNECTION SETUP IS SET UP IN THE COMMUNICATION SYSTEM KS FROM THE COMMUNICATION TERMINAL APPARATUS KE1..n TO THE COMMUNICATION TERMINAL APPARATUS KE-KN IN THE PUBLIC COMMUNICATION NETWORK KN.

CONNECTION SETUP SUCCESSFUL? YES → END

FIG 2C

301 — START OF A CALL FORWARDING ROUTINE AULR BY MEANS OF A SWITCHING-ORIENTED EVENT MESSAGE vei TRANSMITTED BY THE COMMUNICATION SYSTEM KS, WHICH EVENT MESSAGE INDICATES THE ARRIVAL OF A CALL ar IN A COMMUNICATION TERMINAL APPARATUS KE1..n FOR WHICH A CALL FORWARDING AUL TO A CALL NUMBER ruml IS ENTERED OR, RESPECTIVELY, ACTIVATED.

302 — FORMATION AND TRANSMISSION OF AN OPERATIONS AND MAINTENANCE INSTRUCTION amo TO THE COMMUNICATION SYSTEM KS WITH THE CALL NUMBERS mr, ruml, BY MEAMS OF WHICH A CONNECTION SETUP FROM THE COMMUNICATION TERMINAL APPARATUS KE1..n TO THE COMMUNICATION TERMINAL APPARATUS KE-KN WITH THE CALL NUMBER ruml IN THE PUBLIC COMMUNICATION NETWORK KN IS INTRODUCED IN THE COMMUNICATION SYSTEM KS.

CONNECTION SETUP SUCCESSFUL? YES → END

METHOD AND APPLICATION MEANS FOR
ESTABLISHING PERFORMANCE FEATURES
IN PRIVATE COMMUNICATION SYSTEMS
OF A PUBLIC COMMUNICATION
NETWORK

BACKGROUND OF THE INVENTION

In order to control performance features in a communication network (in particular private communication networks), a coupling of the communication systems, (in particular private branch exchanges) with an application apparatus (such as a personal computer) via an application interface (ACL interface) is provided. According to this application interface, the private communication system, for example, the private communication system HICOM 300 of the Siemens company, is physically connected with the application apparatus via a V.24 interface or, alternatively, via an ISDN basic interface (S0). The application interface is preferably realized in an operations and maintenance unit (in the communication system HICOM 300, this is an integrated operations and maintenance server) of a communication system, and controls the communication exchange according to a defined protocol (for example MSV1), with defined messages. The items of information embedded in the messages correspond to the switching-oriented instructions and event messages of the communication system. As a link between the application apparatus and the communication system, a program structure suited for the execution of the switching-oriented instructions and for generating the switching-oriented event messages is provided, that is one that supports computer-controlled connection setups, whereby the connection control is influenced by the switching-oriented instructions. The current switching-oriented state of connections, that is also incoming calls, is indicated by means of switching-oriented event messages.

In addition, performance features, such as call forwarding and callback, can be activated by communication terminal devices connected to a private communication system, using the user interfaces of the respective communication terminal apparatus. Normally, for example, a subscriber activates a call forwarding to his allocated communication terminal apparatus, in order to forward calls coming into his communication terminal apparatus to another terminal apparatus, for example, to another communication terminal apparatus in his company. The callback performance feature is activated by a subscriber so that, after an unsuccessful call with a communication terminal apparatus connected to the private communication system (that is an internal subscriber), a callback will be received automatically from this internal subscriber. In certain situations, for example during business trips or at a home workplace, it would be advantageous to set up, or, respectively, to activate or to deactivate, performance features (for example call forwarding or callback) from arbitrary communication terminal apparatus of a public communication system in a private communication system connected thereto. For example, it should be possible for a subscriber on a business trip, at his allocated communication terminal apparatus in the private communication system, to set up or, respectively, to activate a callback to the communication terminal apparatus in the public communication network at which the subscriber is currently located.

SUMMARY OF THE INVENTION

It is an object of the present invention to enable performance features of communication terminal apparatuses connected to a private communication system to be set up or, respectively, activated from a public communication network, that is externally.

An important aspect of the inventive method is that all unsuccessful calls directed to a communication system (in particular a private communication system) from a communication network (in particular a public communication system) and directed to at least one performance feature communication terminal apparatus of the private communication system, are acquired. The inventive method is designed for incoming calls that, in the communication system, are switched directly to the relevant communication terminal apparatuses of the private communication system, using direct dialing information inserted in the incoming calls. For this purpose, both the calling number of the calling communication terminal apparatus and that of the called communication terminal apparatus are inserted in the signaling information of the incoming calls. The inserted call numbers of the calling and of the called communication terminal apparatus are also acquired, and are transmitted to the above-described application apparatus via the application interface. A feature to be activated or, respectively, to be set up is entered in the application apparatus for a communication terminal apparatus of the private communication system, dependent on the acquired call numbers, including at least a part of the acquired call numbers, whereby the performance feature to be entered is determined by the call number of the virtual performance feature communication terminal apparatus. If for example two performance feature communication terminal apparatuses are provided (one for the call forwarding performance feature and another for the callback performance feature), the performance feature to be entered, for example, call forwarding or callback, is determined by the call number of the respective performance feature communication terminal apparatus.

An important advantage of the inventive method is that an "external setting up or, respectively, activation," that is an activation or, respectively, a setting up by a communication terminal apparatus of a public communication network, is possible, whereby a corresponding application, realized as a program, is to be implemented only in the application apparatus, and the communication system specified above remains unaltered. In addition, the application realized in the application apparatus can be modified easily by means of inputs at its user interface (a keyboard, in the case of a personal computer). This results in great flexibility is for the setting up or, respectively, activation of various performance features for the most various groups of communication terminal apparatuses.

If the callback performance feature is to be set up, the performance feature communication terminal apparatus is allocated a call number that indicates this callback performance feature. A callback is entered in the application apparatus, provided that at least one unsuccessful incoming call for the respective communication terminal apparatus and incoming call directed to a performance feature terminal apparatus are acquired within a predetermined time span, and the incoming calls agree in the call number of the respective calling communication terminal apparatus. This means that a callback is set up or, respectively, entered for a communication terminal apparatus only if, within a predetermined time span, for example two minutes, an incoming call from a communication terminal apparatus of the public communication network to the respective communication terminal apparatus was unsuccessful, and an additional incoming call from the same communication terminal apparatus of the public communication network to a specific performance feature communication terminal apparatus was acquired. In the application apparatus, after the inventive entering of a callback for a respective communication terminal apparatus connected to the private communication system, after an activity of the respective communication terminal apparatus, which activity is reported by the communication system, a callback is introduced for this apparatus. An important advantage of this measure is that this setting up or, respectively, activation of a callback is introduced and controlled not in the communication system, but rather in the application apparatus, whereby, through a communication system explained above, only the activity of the respective communication terminal apparatus is reported. The callback is advantageously introduced and controlled by means of operating and maintenance instructions, transmitted to the communication system via the application interface. In the communication system, according to the operating and maintenance instructions a connection setup is introduced from the respective communication terminal apparatus to the respective calling communication terminal apparatus in the public communication network.

If the performance feature call forwarding is to be set up, a call number indicating the call forwarding performance feature is allocated to the performance feature communication terminal apparatus, and a call forwarding for the respective communication terminal apparatus is entered in the application apparatus, provided that an incoming call directed to the respective virtual performance feature communication terminal apparatus is acquired. According to a first variant, in the application apparatus a call forwarding call number is entered or, respectively, predetermined in advance for the respective communication terminal apparatus of the private communication system. For example, the call number of the home workplace is entered or, respectively, predetermined via the user interface of the application apparatus as a call forwarding call number. Using the application means, after an inventive entering of a call forwarding for one of the communication terminal apparatuses, an incoming call directed to this apparatus is forwarded to a communication terminal apparatus determined by the call forwarding call number. Alternatively, the call forwarding call number can be inserted into an incoming call that is directed to the performance feature communication terminal apparatus. This call forwarding call number is additionally acquired in the communication system, and is transmitted to the application apparatus and stored there.

According to an advantageous development of the inventive method, after a reporting of an incoming call that is directed to a communication terminal apparatus of the private communication system and for which a call forwarding is set up, the call forwarding is introduced to the communication system via the application interface, by means of the transmission of operating and maintenance instructions. In this system, the incoming call is forwarded, according to the operating and maintenance instructions, to a communication terminal apparatus (in the public communication network or in the private communication system) predetermined by the call forwarding call number. By means of this notification of the incoming call and the introduction of the call forwarding by means of the application apparatus, a complete realization of the inventive method is possible in the application apparatus, that is the private communication system specified above remains unaltered.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawing, in which:

FIG. 1 shows, in a schematic diagram, a communication system, including the inventive application apparatus;

FIG. 2A is a flow chart depicting the inventive acquisition routine;

FIG. 2B is a flow chart depicting the inventive call forwarding routine; and

FIG. 2C is a flow chart depicting the inventive callback routine.

DESCRIPTION OF THE PREFERRED EMBODIMENTS

FIG. 1 shows a communication system KS (in particular, a private communication system) with an application interface (designated below as ACL interface ACL), to which an application apparatus PC (designated personal computer PC below), realized by a personal computer, is connected via an ACL interface ACL realized in the same way as the application interface. The ACL interface ACL is realized in the communication system KS by means of an ACL program structure ACLP, implemented in an integrated operations and maintenance server IPS; in the personal computer PC, the ACL interface ACL is physically and procedurally realized in an ACL unit ACLE. The abbreviation ACL stands for Application Connectivity Link, and means that, via the ACL interface ACL, a communication exchange for an application-dependent connection control in the communication system KS is controlled via a connection, that is via a link.

For switching-oriented control and operating and maintenance control, the communication system KS has a controller ST that is connected with a coupling field KF and with the integrated operating and maintenance server ISP. In the controller ST, there is provided, in addition to the essential switching-oriented and operating and maintenance program structure (not shown), a computer-controlled program structure DGV (that is a switching routine DGV), which supports connection setups, for cooperation with the personal computer PC, and, in addition, a text-data program structure TDD, by means of which data from communication terminal apparatuses connected to the communication system KS are transmitted to the personal computer PC, and vice versa, via the communication system KS.

Communication terminal apparatuses KE1 . . . n are connected to the coupling field KF, for which apparatuses internal communication connections, and communication connections directed to a public communication network KN, are switched. For this purpose, a traffic relation group VBZ is configured (that is set up) in the coupling field KF, using the controller ST, to which group are allocated connection lines VL1 . . . x, connected to the communication system KS. The connection lines VL1 . . . x are connected with the public communication network KN, in particular with the public ISDN communication network ISDN. In the communication network KN, assume that during connection setups, that is during incoming calls, both the call number of the originating communication terminal apparatus and that of the target communication terminal apparatus KE-KN, that is the call number of the calling and of the called communication terminal apparatus KE-KN are transmitted both within the communication systems and between the communication systems. This means that a call number rnr of the calling communication terminal apparatus, as well as a call number rng of the called communication terminal apparatus, KE-KN, KE1 . . . n, is inserted in a call ar, in the private communication system KS, coming in from the public ISDN communication network ISDN. The two call numbers rnr, rng are transmitted as signaling information in the context of the ISDN signaling. A direct dialing item of information (not shown) is contained in the call number rng of the called communication terminal apparatus KE1 . . . n, by which a communication terminal apparatus KE1 . . . n connected to the private communication system KS is addressed. Using this direct dialing item of information, the incoming call ar is switched directly to the respective communication terminal apparatus KE1 . . . n.

The connection lines VL1 . . . x, as well as the communication terminal apparatuses KE1 . . . n, are connected to the coupling field KF via subscriber terminal circuits SLM (indicated by a dotted rectangle). The computer-controlled program structure, which supports connection setups, or, respectively, the switching routine DGV can be set by means of operating and maintenance settings, in such a way that only unsuccessful calls ar' coming in via the connection lines VL1 . . . x are acquired. Unsuccessful incoming calls ar' are calls ar' in which the addressed communication terminal apparatus KE1 . . . n is already included in another communication relation, that is occupied, or in which the addressed communication terminal apparatus KE1 . . . 1, i.e. the respective communication terminal apparatus KE1 . . . 1, is not activated (e.g., the subscriber does not pick up). During acquisition of an incoming unsuccessful call ar', the call number rnr, rng of the calling terminal apparatus and that of the called communication terminal apparatus KE-KN, KE1 . . . n, are acquired by means of the switching routine DGV, and are transmitted to the application apparatus PC via the ACL interface ACL.

According to the invention, incoming calls ar" that are addressed or, respectively, directed to specific performance feature communication terminal apparatuses KE-AUL, KE-RR, are also acquired. A performance feature communication terminal apparatus KE-AUL is hereby for example provided for a call forwarding AUL performance feature, and the additional performance feature communication terminal apparatus KE-RR is provided for the callback RR performance feature. This means that the call number aul-rn, rr-rn of the called communication terminal apparatus KE-AUL, KE-RR, acquired in an incoming call, represents a callback RR or call forwarding AUL performance feature. In the acquisition of incoming calls ar" of this sort, the call numbers rnr, aul-rn, rr-rn of the calling communication terminal apparatus, as well as of the called communication terminal apparatus KE-KN, KE1 . . . n, are likewise acquired using the switching routine DGV, and are forwarded to the application apparatus PC.

The application apparatus PC has a microprocessor system MPS, in which a microprocessor MP, a memory SP, an ACL unit ACLE and a user interface BOF are connected to a microprocessor bus MB. As is standard in PCS, the user interface BOF is formed by a monitor unit and a keyboard. In the one memory SP, having a data and program region, an acquisition routine ER, a call forwarding routine AULR and a callback routine RRR are stored. Based on the previously explained communication system KS, the inventive method is essentially realized using these three routines ER, RRR, AUL.

The manner of operation of these three routines ER, RRR, AUL is explained in more detail in the essentially self-explanatory flow diagrams in FIGS. 2A, 2B, and 2C. Using operating and maintenance instructions amo, transmitted to the communication system KS by the application means PC, and using the control means ST, the respective switching-oriented actions (in the exemplary embodiment, the forwarding of an incoming call ar or the introduction of a callback) are introduced or, respectively, carried out according to the switching-oriented items of information contained in the operating and maintenance instructions amo. The positive or negative execution of the switching-oriented action respectively introduced by means of an operating and maintenance instruction amo is reported to the application means PC by means of an operating and maintenance event message vei that contains a relevant item of information. In this message, the respectively desired switching-oriented action can be repeated or terminated, according to the application currently running.

Referring now to FIG. 2A, in section 101, the acquisition routing ER is started by transmission of a switching-oriented event message vei with the call number rnr of the calling communication terminal apparatus KE-KN, as well as the call numbers rng, aul-rn, rr-Rn of the called communication terminal apparatus KE1 . . . n, KE-AUL, KE-RR. In section 102, call numbers rnr, rng of the calling and of the called communication terminal apparatus are stored in the memory SP. In section 103, call forwarding routine AULR is activated for the communication terminal apparatus KE1 . . . n to which the acquired call number aul-Rn is allocated. In section 104 it is determined if the acquired concomitantly transmitted rnr is equal to an rnr transmitted in the last 2 minutes with an unsuccessful call ar'.

Referring now to FIG. 2B, in section 201, the callback routine RRR is started a switching-oriented event message vei transmitted by the communication system KS, which event message indicates the end of an activity of a communication terminal apparatus KE1 . . . n for which a callback RR is entered or, respectively, activated. In section 202, an operations and maintenance instruction amo is formed and transmitted to the communication system KS with the call numbers rnr, rng, by which a connection setup is set up in the communication system KS from the communication terminal apparatus KE1 . . . n to the communication terminal apparatus KE-KN in the public communication network KN.

Referring now to FIG. 2c, in section 301, the call forwarding routine AULR is started by a switching-oriented event message vei transmitted by the communication system KS, which event message indicates the arrival of a call are in a communication terminal apparatus KE1 . . . n for which a call forwarding AUL to a call number rum1 is entered or, respectively, activated. In section 302, an operations and maintenance instruction amo is formed and transmitted to the communication system KS with the call numbers rnr, rum1, by which a connection setup from the communication terminal apparatus KE1 . . . n to the communication terminal apparatus KE-KN with the call number rum1 in the public communication network KN is introduced in the communication system KS.

The inventive method can be used for setting up additional performance features, such as for example automatic call forwarding of incoming calls to a voice storage unit (voice mail server or phone mail) or answering machine. The corresponding application, realized as a program, is hereby to be provided in the application means.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for establishing performance features for communication terminal apparatuses connected to a communication system, the communication system being connected via an application interface and with an application apparatus and with a communication network via connection lines comprising the steps of:

acquiring unsuccessful calls coming in from the communication network and directed to a communication terminal apparatus of the communication system, as well as incoming calls directed to at least one virtual performance feature communication terminal apparatus of the communication system that represents a performance feature;

acquiring call numbers corresponding to the respective called and of a respective calling communication terminal apparatus;

transmitting the acquired call numbers to the application apparatus via an application interface;

entering a performance feature, including at least a part of the acquired call numbers in the application apparatus, dependent on the acquired call numbers, respectively for a communication terminal apparatus of the communication system, the performance feature to be entered being determined by an acquired call number of a virtual performance feature communication terminal apparatus.

2. The method according to claim 1, wherein the communication system is a private communication system and the communication network is a public communication network.

3. The method according to claim 1, wherein the method further comprises:

allocating, if a callback performance feature to be set up, a call number indicating a callback performance feature to the virtual performance feature communication terminal apparatus;

entering a callback in the application apparatus provided that, within a predetermined time span, at least one unsuccessful incoming call for the respective communication terminal apparatus and an incoming call directed to a virtual performance feature communication terminal apparatus are acquired, in which the call numbers (rnr) of the calling communication terminal apparatus agree;

introducing a callback in the application apparatus for a respective communication terminal apparatus after an entering of a callback for the respective communication terminal apparatus connected to the private communication system, and after an activity of the respective communication terminal apparatus, which activity is reported by the communication system.

4. The method according to claim 3, wherein the callback is introduced by transmission of operating and maintenance instructions, containing the call numbers of the calling and called communication terminal apparatus, to the communication system via the application interface, and wherein a connection setup from the respective communication terminal apparatus of the private communication system (KS) to the respective communication terminal apparatus (KE-KN) in the public communication network (KN) is set up in the communication system according to the operating and maintenance instructions.

5. The method according to claim 1, wherein the method further comprises:

allocating, if a call forwarding performance feature to be set up, a call number indicating a call forwarding to the virtual performance feature communication terminal apparatus for the respective communication terminal apparatuses;

entering a call forwarding for the respective communication terminal apparatus in the application apparatus, provided that an incoming call directed to the respective virtual performance feature communication terminal apparatus is acquired;

entering a call forwarding call number in the application apparatus for the respective communication terminal apparatus;

forwarding, using the application apparatus, after an entering of a call forwarding for a communication terminal apparatus connected to the private communication system, an incoming call directed to said communication terminal apparatus is forwarded to a communication terminal apparatus determined by the call forwarding call number.

6. The method according to claim 5, wherein the application apparatus, after a reporting of an incoming call that is directed to a communication terminal apparatus of the private communication system and for which a call forwarding is set up, the call forwarding is introduced by transmission of operating and maintenance instructions to the communication system via the application interface, and wherein in the communication system the incoming call is forwarded, according to the operating and maintenance instructions, to a communication terminal apparatus determined by the call forwarding call number.

7. The method according to claim 1, wherein the method further comprises:

allocating in a call forwarding performance feature to be set up, a call number indicating a call forwarding to the virtual performance feature communication terminal apparatus for the respective communication terminal apparatus;

entering in the application apparatus, a call forwarding for the respective communication terminal apparatus, provided that an incoming call directed to the respective virtual performance feature communication terminal apparatus is acquired;

inserting at least one call forwarding call number into an incoming call directed to the performance feature communication terminal apparatus, which is additionally acquired and is transmitted to the application apparatus, and is stored in the application apparatus;

forwarding in the application apparatus, after entering of a call forwarding for a communication terminal apparatus connected to the private communication system, an incoming call directed to said communication terminal apparatus to a communication terminal apparatus determined by the call forwarding call number.

8. The method according to claim 7, wherein the application apparatus, after a reporting of an incoming call that is directed to a communication terminal apparatus of the private communication system and for which a call forwarding is set up, the call forwarding is introduced by transmission of operating and maintenance instructions to the communication system via the application interface, and wherein in the communication system the incoming call is forwarded, according to the operating and maintenance instructions, to a communication terminal apparatus determined by the call forwarding call number.

9. The method according to claim 1, wherein in the communication system the connection lines are allocated to a traffic relation group, and wherein unsuccessful calls and calls of the traffic relation group that are coming into the performance feature communication terminal apparatus are acquired using a switching routine implemented in the communication system.

10. The method according claim 1, wherein the public communication network is an integrated service digital network.

11. An application apparatus for setting up performance features in a communication system comprising:

a microprocessor system for monitoring the application apparatus;

an acquisition routine executed by the microprocessor system and being a program for acquisition of call numbers of unsuccessful calls and of incoming calls directed to at least one virtual performance feature communication terminal apparatus, the call numbers being transmitted via an application interface, and for determination of performance features to be entered, based on transmitted call numbers, and a predetermined time span;

a call forwarding routine executed by the microprocessor system and being a program, for introduction of a forwarding of an incoming call, reported via the application interface, for a communication terminal apparatus of the private communication system, for which a call forwarding is set up;

a callback routine executed by the microprocessor system and being a program, for introduction of a callback in the communication system after an activation of a communication terminal apparatus for which a callback is set up, said activation being reported via the application interface.

12. An application apparatus for setting up performance features in a communication system, comprising:

a microprocessor system for monitoring the application apparatus;

an acquisition routine executed by the microprocessor system and being a program, for acquisition of call numbers of unsuccessful calls and of incoming calls directed to at least one virtual performance feature communication terminal apparatus, the call numbers being transmitted via an application interface, and for determination of performance features to be entered, based on transmitted call numbers, and a predetermined time span;

at least one of a call forwarding routine and a callback routine that are executable by the microprocessor system;

the call forwarding routine being a program, for introduction of a forwarding of an incoming call, reported via the application interface, for a communication terminal apparatus of the private communication system, for which a call forwarding is set up; and the callback routine being a program, for introduction of a callback in the communication system after an activation of a communication terminal apparatus for which a callback is set up, said activation being reported via the application interface.

* * * * *